G. C. BEIDLER.
PHOTOGRAPHIC AND DEVELOPING APPARATUS.
APPLICATION FILED OCT. 3, 1916.

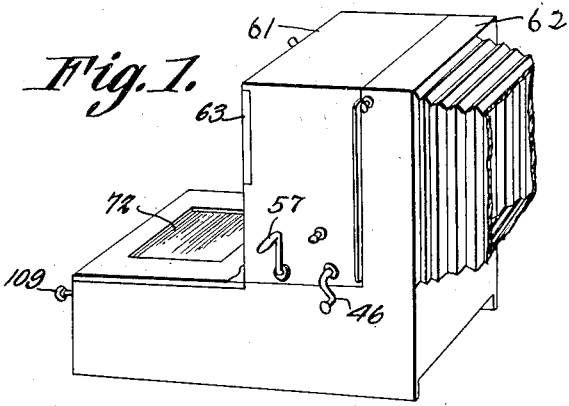
Fig. 1.
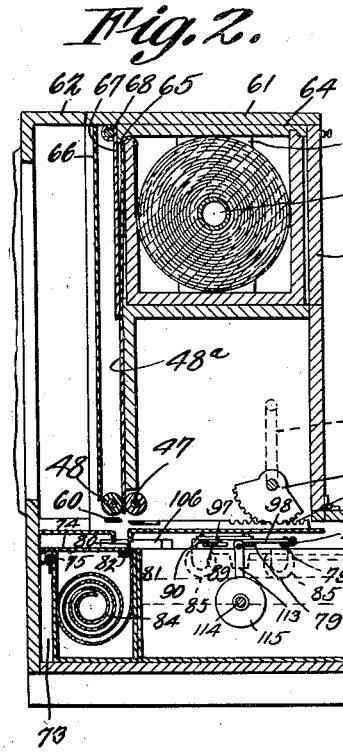
Fig. 2.
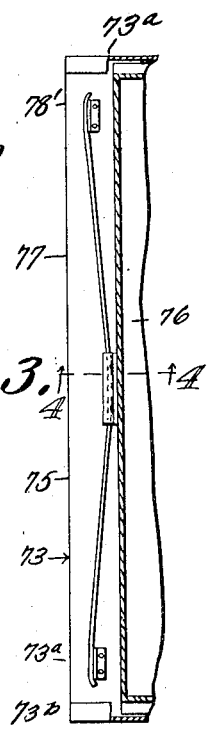
Fig. 3.
Fig. 6.
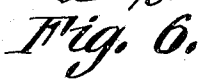
Fig. 4.
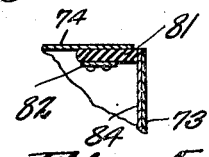
Fig. 5.
Fig. 5ª.

1,359,481.

Patented Nov. 23, 1920.
3 SHEETS—SHEET 2.

Inventor,
George C Beidler,
By Franks Ankerman,
Attorney

G. C. BEIDLER.
PHOTOGRAPHIC AND DEVELOPING APPARATUS.
APPLICATION FILED OCT. 3, 1916.
1,359,481.
Patented Nov. 23, 1920.
3 SHEETS—SHEET 3.
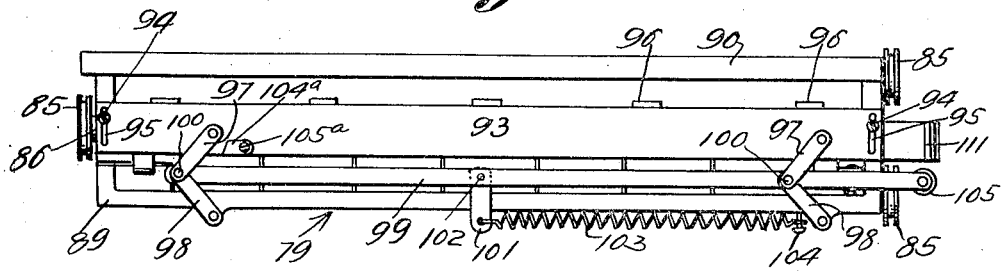
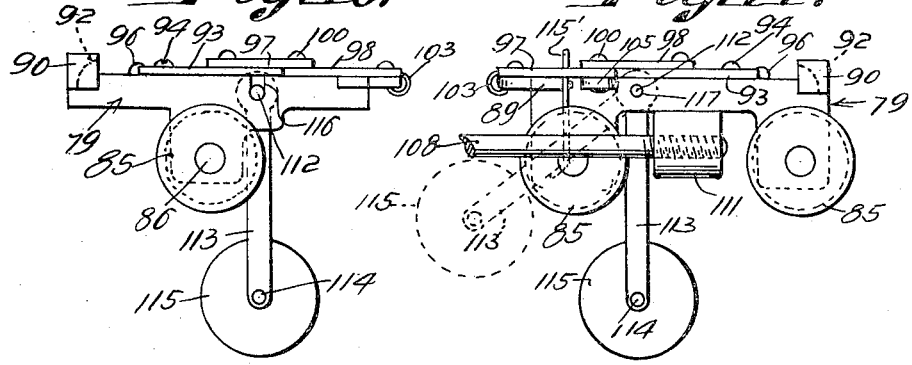
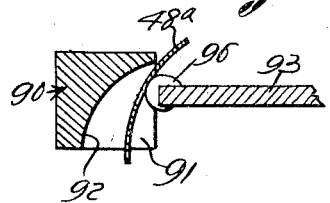
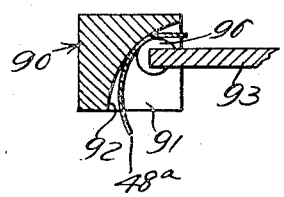
Inventor,
George C. Beidler,
By Fanks Ankerman
Attorney

UNITED STATES PATENT OFFICE.

GEORGE C. BEIDLER, OF ROCHESTER, NEW YORK.

PHOTOGRAPHIC AND DEVELOPING APPARATUS.

1,359,481.   Specification of Letters Patent.   Patented Nov. 23, 1920.

Application filed October 3, 1916. Serial No. 123,542.

*To all whom it may concern:*

Be it known that I, GEORGE C. BEIDLER, a citizen of the United States of America, and resident of Rochester, in the county of Monroe and State of New York, have invented certain new and useful Improvements in Photographic and Developing Apparatus, of which the following is a specification.

This invention relates to photographic apparatus and particularly to those apparatus designed for subjecting film to the action of fluid after having been exposed to light, thereby making a device in which there is a self-contained mechanism for subjecting the film to fluid for developing the same and means for exposing the film to light.

A still further object of this invention is to provide novel means by which the film is received in a comparatively small container for liquid which acts on the coated surface of the film, means being provided for removing the film from the container and means being furthermore provided for removing excessive moisture or fluid from the surfaces of the film, thus conserving the liquid utilized for developing or otherwise treating the film since the liquid removed from the film is held within the container.

A further object of this invention is to provide a novel film clamp and carriage, and to provide film carrying means with a submerging device by which film may be forced into liquid in a receptacle to which film is delivered by the said carrying means.

It is also an object of the invention to produce a paper clamp and carrying mechanism in which the clamped parts bend or curve to the film so that the film will more readily descend or duck when it is delivered to the fluid in the second mentioned receptacle or pan.

With the foregoing and other objects in view, the invention consists in the broad idea as well as in the details of construction to be set forth in the claims during the prosecution of the application, the said claims to be of such scope as to give protection commensurate with the inventive act in view of the state of the art when the said invention was produced.

In describing the invention in detail, reference will be had to the accompanying drawings forming part of this specification wherein like characters denote corresponding parts in the several views, and in which—

Figure 1 illustrates a view in perspective of the apparatus parts being broken away;

Fig. 2 illustrates a sectional view through the casing;

Fig. 3 illustrates a detail view of the receptacle and cover with means for holding the cover normally closed;

Fig. 4 illustrates a sectional view of a fragment of a receptacle for containing fluid;

Fig. 5 illustrates a sectional view of a fragment of said receptacle showing a cover and liquid removing device;

Figure 7:
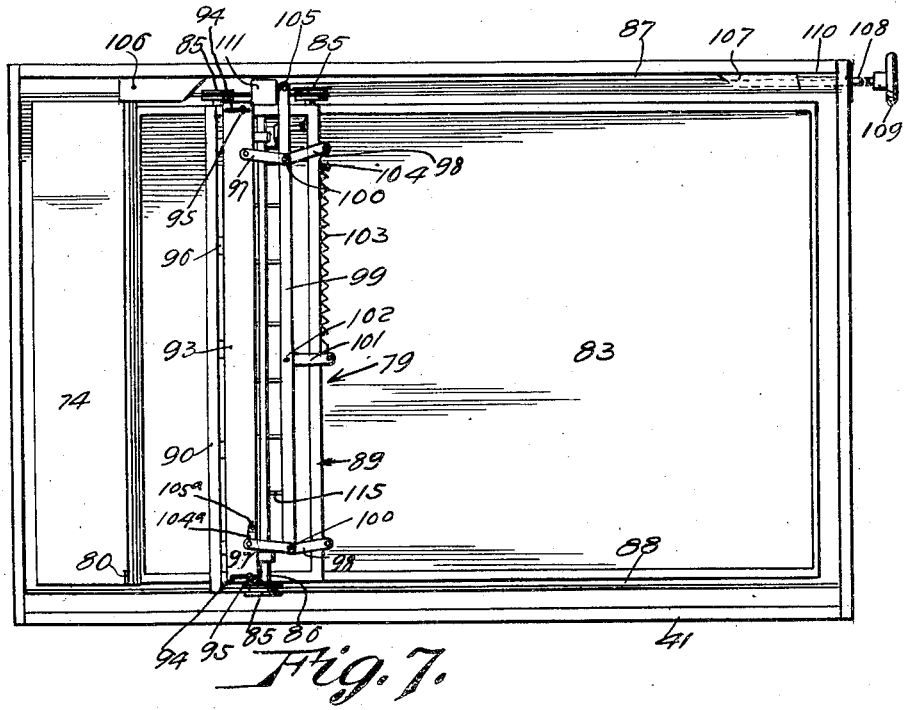
Figure 8:
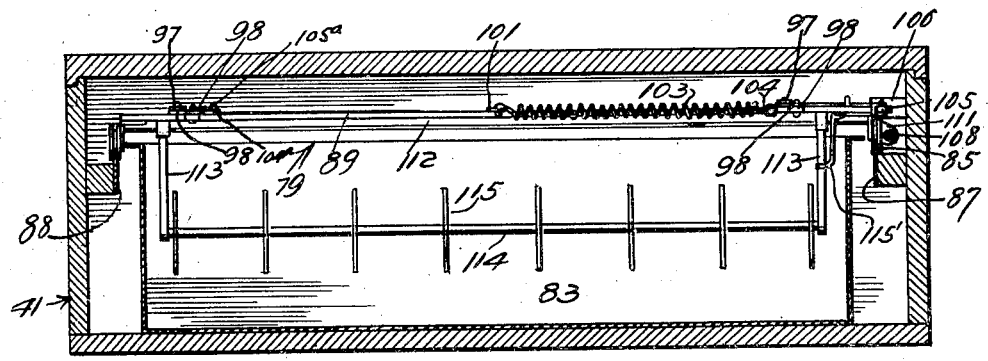

Fig. 5ª illustrates a view similar to that shown in Fig. 5 with the parts in different positions;

Fig. 6 illustrates a perspective view of a fragment of a cover for a receptacle for holding fluid;

Fig. 7 illustrates a plan view of a portion of the casing in which receptacles are held for receiving film, the film carrying means being shown in plan;

Fig. 8 illustrates a sectional view through a portion of the casing;

Fig. 9 illustrates a plan view of the film clamp and carriage;

Fig. 10 illustrates a view in elevation of one end of the film carriage;

Fig. 11 illustrates a view in elevation of the opposite end thereof;

Fig. 12 illustrates a sectional view of a fragment of the frame of the carriage and the clamping member coacting therewith;

Fig. 13 illustrates a view of the parts shown in Fig. 12 in different positions; and Fig. 14 illustrates a side elevation of a fragment of film showing the result of the action of the clamp thereon.

A crank 46 is provided on the outside of the casing 41 and it is operative to rotate the feed rollers 47 and 48, the said crank 46 being mounted on an extension of the shaft or roller 47 so that as it is turned film 48ª is moved. The rollers 47 and 48 are geared together by the toothed wheels 49 and 50. The crank extends through the casing and has a toothed wheel 57' mounted on it, the said toothed wheel meshing with a rack bar 58 which rack bar carries a knife 59 coacting with a knife or blade 60 for cutting film.

A portion of the casing constitutes a magazine 61 for containing the unexposed film and this magazine may be integral with or movable with relation to that portion of the casing identified by the reference numeral 41. Preferably the magazine section 61 carries the film drawing and film registering and cutting mechanism and is hinged to swing transversely with relation to that portion of the casing identified by the reference numeral 41 and with relation to that portion of the casing identified by the reference numeral 62 which indicates the exposing chamber of the photographing apparatus, although it is my purpose to be unrestricted as to the manner of movably mounting the magazine. The said magazine section furthermore has a door 63 for the insertion and removal of boxes such as 64 which are adapted to contain rolls of film, and said boxes also have a clearance 65 at the junction of the top or cover and one side wall so that film may pass through the opening or clearance to the exposing chamber, and to the rollers which are utilized for drawing the film. The magazine portion of the casing also has a dark slide 66 of ordinary construction and a shield or shutter 67 which may be moved up or down in the exposing chamber for shielding an area of film within the exposing chamber from the action of light admitted through the lens. By the use of this member 67, a greater or less area of film may be exposed and it works as a saving where the whole area of film in the exposing chamber is not to receive an image at each exposure, for by this member 67 the portion below the said member may be exposed to light and the area may as stated be varied to suit particular requirements by having the member 67 wound on a roll 68 so that by turning the roll, the member 67 may be wound or unwound.

By reason of the provision of the door 63, the boxes 64 containing film may be quickly applied to and removed from the said casing as stated and furthermore the interior of the boxes 64 may have core supporting spindles 69 held by sliding blocks 70 and the box would then be capable of holding films of such widths by providing blocks of different thicknesses in order that they will operate as filling blocks, said blocks being proportional to the length of the roll of film and its core, it being shown in the drawing that the blocks are slidable in the box at its ends.

A portion of the inclosure or casing has a glass pane 72 of a color which will intercept actinic rays of light and through which glass, the interior may be viewed and the condition of the prints being produced may be observed. The relation of the film container or magazine, the exposing chamber and the means for drawing the film are well illustrated in Fig. 2 of the drawing and it is preferable to associate with these instrumentalities, means for receiving the film after it is exposed, the said receiving means preferably containing a liquid adapted to act on the coated surface of the film, such as developing fluid and hence I prefer to supply a receptacle 73 having a sliding cover 74 which is held normally in position to close the receptacle by a spring 75 which is seated between the block 76 and the wall 77 of the receptacle, the said spring having its ends bearing against depending portions 78 of the cover and tending to hold the cover closed. The edge of the cover opposite the spring is engaged by a carrier 79 and as the carrier is moved, the cover is slid to produce an opening in the receptacle so that film may pass into the said receptacle. In the present embodiment of the invention, the cover has an ear 80 which is engaged by a portion of the carriage for imparting movement to the cover. The said cover in the present instance also carries a yielding or other member 81 held on the cover by a clamping strip 82 and the said member 81 is adapted to press against the film as it is being drawn from the receptacle with sufficient pressure to wipe the said film or remove superfluous fluid and thus conserve the said fluid and at the same time prevent the carrying of such fluid into another receptacle 83 which, in the present embodiment of the invention, is primarily provided for containing fixing fluid. Thus, by the removal of the excessive fluid as the film passes from the first receptacle, deterioration of the fluid in the second mentioned receptacle is obviated and a great saving in the material or liquid in the first receptacle is effected, and when the said first mentioned receptacle contains developing fluid, economical operation of the apparatus is insured.

The receptacle 73 furthermore may contain a film holding device 84 in scroll formation, the convolutions of which are separated from each other so that film delivered to the receptacle will follow the convolutions and be coiled or wound loosely so that liquid in the receptacle may gain access to the coated surface of the film.

The carrier 78 is mounted on wheels 85 and a wheel on one rotates on a shaft 86, the said wheels being adapted to travel on tracks 87 and 88 respectively, supported in any appropriate way within the casing. The carrier comprises a frame 89, one side of which constitutes a clamping member 90 with a recessed side 91, the wall 92 of the recess being preferably curved and being adapted to coact with a movable clamping member 93 for holding film while the carrier is being moved and the said clamping members being effective to draw film from the first mentioned receptacle and to carry it to the second mentioned receptacle where it is deposited by releasing the clamping members in a manner to be presently explained.

One object for having the clamping member 90 with the curved surface 92 is to effect bending of the edge of the film when the movable clamping member presses it into engagement with the coacting clamping member, and it has been found in practice that the curl or bend imparted to the film is sufficient to cause the said edge of the film to duck or descend in the fluid in the second mentioned receptacle when it is released by the clamping members, thus making the film more easily submerged by the submerging member which will be presently described.

The frame 89 of the carrier has studs or other guiding means 94 which enter slots 95 of the movable clamping member 90 and the said movable clamping member has lugs or bosses 96 which constitute the gripping surfaces or members which coact with the clamping member 90 so that as the clamping member is operated, it is effective to hold or release the film according to the direction of movement imparted to it.

As a means for actuating the movable clamping member, I have, in the present embodiment of the invention, provided the lazy tongs or link construction in which links 97 and 98 are arranged in pairs, two pairs being here shown in use, the links 97 being pivotally connected to the movable clamping member and the links 98 being pivotally connected to the frame. A reciprocating or thrust bar 99 is slidable longitudinally of the frame and the inner ends of the links 97 and 98 are mounted on pivots 100 carried by the reciprocating bar 99, so that as the reciprocating bar is moved inwardly, the movable clamping member is drawn away from the stationary clamping member and when the said bar moves outwardly, the links straighten or aline or have a tendency to aline, thus throwing the movable clamping member toward the stationary clamping member. The reciprocating bar is held normally under tension to move it outward and this is accomplished by the presence of the arm 101 attached to the said bar by a fastening such as 102 and the arm 101 has one end of a spring 103 connected to it, the opposite end of the said spring being anchored to a stud 104 on the frame. The reciprocating bar is, therefore, under tension of the spring to move it longitudinally of the frame and when it is operated by the said spring, the tendency is to move the clamping member 93 into engagement with the stationary clamping member. The degree of movement which may be imparted to the links and bar is limited by the abutment 104$^a$ secured to the clamping member 93 by the fastening 105$^a$. When one of the links 97 has moved a predetermined distance, it will strike the block 104$^a$ and arrest the links.

The outer end of the reciprocating bar has an anti-friction wheel 105 which rides over the cams 106 and 107 after the carrier has moved a predetermined distance in the casing and the cam 106 is slightly thicker than the cam 107 as it is desirable to increase the throw of the reciprocating bar to increase the space between the movable and stationary clamping members when the carrier is in position to receive film whereas when it is necessary or desirable to release the film, slight movement of the clamping member is sufficient to disengage the film and permit it to fall into the fluid in the second mentioned receptacle.

The carrier is operated or moved by the rod 108 provided with a handle 109 and the said rod is guided in a bearing 110 in the end of the casing. The inner end of the rod is preferably threaded in a lug or extension 111 of the frame and, therefore, as the operating rod is moved outwardly and inwardly, motion is communicated to the carrier for the purpose of drawing film from the first mentioned receptacle and delivering it to the second mentioned receptacle.

To insure a submergence of the film in the liquid of the second mentioned receptacle, a submerging means is also provided and this, as embodied in the present construction, comprises a shaft 112 journaled in the frame 89 and having depending arms 113 which carry a spindle or shaft 114 on which disks 115 are mounted and the construction may be that the disks rotate on the spindle or that the spindle rotates in the arms 113. Either means is effective as it permits the rotation of the disks and they travel over film deposited in the second mentioned receptacle and press it under the fluid. The fact that one edge of the film is bent down slightly facilitates the travel of the said disks over the film and obviates any engagement of the disks with the edge of the film. This is a desirable feature as if the disks engage the end of the film they would have a tendency to move the film longitudinally instead of vertically.

The submerging frame or means may be elevated and a latch 115′ is supplied for movement under one of the arms 113 when it is elevated and the latch is effective to hold the submerging device in such elevated position.

One of the journal bearings for the shaft 112 is created by forming a slot 116 in the upper surface of one end of the frame so that by this means, the said shaft may be readily applied to or removed from the frame, it being understood that the opposite end of the shaft is rotatable in a recess 117 in the opposite end of the frame.

The receptacle 73 has flanges 73$^a$ at its end and the cover 74 has inturned flanges 73$^b$ which embrace the edges of the flanges 73$^a$ to form a guiding connection between the two members.

The operation of the device will, it is thought, be understood from the foregoing description of the elements and their functions as enumerated in connection with a description of the said elements. Certainly, the means for containing the supply of film and the operation of the means for drawing film and for cutting film will be understood by those skilled in the art and after the film is exposed and drawn, the operation will result in thrusting it or feeding it into the receptacle 73 where it will be coiled in the holder 84 and subjected to the action of the fluid within the said receptacle. When the handle 109 is operated to reciprocate the rod 108, the carrier will be moved on its tracks and when thrust inwardly, the member or members 80 on the cover 74 are encountered and the said cover is moved to create an opening for the admission of the film as it is moved by the drawing or moving means. While the carrier is being moved to the last described position, the anti-friction wheel 105 travels in engagement with the cam 106, thus moving the reciprocating bar so that the toggles withdraw the movable clamping member from the stationary clamping member to create a clearance for the passage of the film. The relation of the cam to the carrier is such that the carrier has a slight movement before the cam releases the reciprocating bar and during this slight movement, the edge of the paper which projects from the receptacle is bent slightly and therefore the reciprocating bar is released and the clamping member forces the film against the stationary clamping member, and upon further outward movement of the carrier, the film is withdrawn from the receptacle 73 and with the initial outward movement of the carrier, the cover is forced by the spring into position to close the said receptacle and at the same time causes the liquid removing members 81 to engage the film and press it against one wall of the receptacle 73 or against a portion of the apron or film holder contained in the receptacle so that fluid is removed from the surface of the film according to the objects stated. The film is then carried over the second receptacle and then the anti-friction roller of the reciprocating bar is thrust inwardly to a sufficient degree to permit it to fall in the second receptacle and be deposited on the fluid therein with the curved or bent edge of the film immersed. Upon reciprocating the carrier, the immersing device operates to force the film under the fluid. It is desirable, in the operation, to move the film carrier back and forth to effect a submergence without moving the carrier to either limit of its travel, although when the operation is to be repeated, the carrier will be moved to its extreme inner position where the clamping members will be open or out of engagement, the door of the cover will be moved to create a clearance for the admission of film, and the film drawing means can be operated to deliver the film between the clamping members into the receptacle after which the film may be cut in the manner stated and the cut film may be drawn from the receptacle, and the operation may, of course, be carried on to any extent desired.

I claim—

1. In an apparatus relating to photography, a casing, a film carrier mounted to move in an approximately horizontal plane, said carrier including clamping members, a receptacle with relation to which the carrier is movable, a cover for the said receptacle, means whereby the cover is opened when the carrier is in position to receive film, means whereby the clamping members of the carrier are separated when the carrier is in position to receive film, means whereby the clamping members are closed to engage film when the carrier is moved away from the said receptacle, and means for operating the clamping members to release film.

2. In an apparatus relating to photography, a film carrying means including clamping members and means whereby the clamping members bend the film at an edge when clamping it to facilitate the submergence of the film when deposited in liquid.

3. In an apparatus relating to photography, a film clamping member having a curved film engaging surface and a movable clamping member for pressing the film into engagement with the curved surface whereby the film is curved so that its edge stands at a tangent to the body portion thereof.

4. In an apparatus relating to photography, a carrier for film including a clamp having curved film engaging surfaces for bending or curving the film for the purpose described.

5. In an apparatus relating to photography, a carrier for film, means including clamping members, a toggle for operating one of the clamping members, a thrust bar to which the toggle is pivoted, means for movably mounting the clamp and means for reciprocating the bar when the film carrying means is moved with relation to it.

6. In an apparatus relating to photography, a film carrying means including a frame, a portion of which constitutes a clamping jaw, said clamping jaw having a curved film engaging surface, a clamping member coacting therewith to press the film into engagement with the curved surface, whereby the film is bent, and means for operating the clamping jaw as the film carrier is moved.

7. In an apparatus relating to photography, a film carrying means including a frame, a portion of which constitutes a clamping jaw, said clamping jaw having a curved film engaging surface, a clamping member coacting therewith to press the film into engagement with the curved surface, whereby the film is bent, means for operating the clamping jaw as the film carrier is moved, said means including toggles connected to the film clamping member, a bar for operating the toggles, and means for moving the bar longitudinally.

8. In an apparatus relating to photography, a film carrying means including a frame, a portion of which constitutes a clamping jaw, said clamping jaw having a curved film engaging surface, a clamping member coacting therewith to press the film into engagement with the curved surface, whereby the film is bent, means for operating the clamping jaw as the film carrier is moved, said means including toggles connected to the film clamping member, a bar for operating the toggles, means for moving the bar longitudinally, and means for limiting the movement of the toggles.

9. In an apparatus relating to photography, a film carrier consisting of a frame including a clamping member, a clamping member coacting with the first mentioned clamping member and slidably mounted on the frame, toggles for operating the movable clamping member, and means for actuating the toggles.

10. In an apparatus relating to photography, a film carrier including a frame having a clamping member with a curved film engaging surface, a movable clamping member coacting therewith, and means for operating the movable clamping member.

11. In an apparatus relating to photography, a frame including a clamping member having a curved film engaging surface, a movable clamping member having film engaging projections spaced apart thereon, and means for operating the movable film clamping member.

12. In an apparatus relating to photography, a receptacle for film, a cover therefor, a film carrier movable with relation to the said receptacle and operative to move the cover on the receptacle to open the receptacle for the admission of film, a film clamping member comprising a portion of the film carrier and operable to engage film projecting from the receptacle and to draw film from the receptacle when the said carrier is moved, and means for operating the clamp to release the film.

13. In an apparatus relating to photography, a receptacle for film, a cover therefor, a film carrier movable with relation to the said receptacle and operative to move the cover on the receptacle to open the receptacle for the admission of film, means carried by the cover for removing fluid from the surfaces of the film when withdrawn from the receptacle, a film clamping member comprising a portion of the film carrier and operable to engage film projecting from the receptacle and to draw film from the receptacle when the said carrier is moved, and means for operating the clamp to release the film.

14. In an apparatus relating to photography, a receptacle having a cover, a film engaging means on the cover operative to remove fluid from the surfaces of the film, a carrier mounted to operate in conjunction with the receptacle and having means for moving the cover to open the same, means for closing the cover, a clamp comprising a part of the carrier, means for opening the clamp when in alinement with the opening in the receptacle, means for closing the clamp when the carrier is moved away from the receptacle whereby film is withdrawn from the receptacle and means for opening the clamping members to release the film.

15. In an apparatus relating to photography, a receptacle having a cover, a film engaging means on the cover operative to remove fluid from the surfaces of the film, a carrier mounted to operate in conjunction with the receptacle and having means for moving the cover to open the same, means for closing the cover, a clamp comprising a part of the carrier, said clamp having a curved surface adapted to engage film, a movable clamping member coacting therewith for bending the film, means for operating the clamping member to clamp the film when the film is moved from the receptacle, means for operating the clamp to release the film, and means supported by the carrier for submerging the film.

GEORGE C. BEIDLER.

Witnesses:
R. B. La Force,
C. F. Schmidt.